Figure 3:
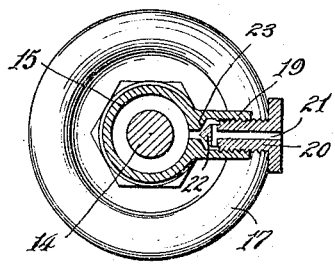

W. H. SMITH.
WASTE VALVE.
APPLICATION FILED AUG. 10, 1916.

1,287,126.

Patented Dec. 10, 1918.

Inventor,
William H. Smith.
By Hull Smith Brock & West
Attys.

UNITED STATES PATENT OFFICE.

WILLIAM H. SMITH, OF CLEVELAND, OHIO, ASSIGNOR TO THE CLEVELAND BRASS MANUFACTURING COMPANY, OF CLEVELAND, OHIO, A CORPORATION OF OHIO.

WASTE-VALVE.

1,287,126.

Specification of Letters Patent.

Patented Dec. 10, 1918.

Application filed August 10, 1916. Serial No. 114,098.

*To all whom it may concern:*

Be it known that I, WILLIAM H. SMITH, a citizen of the United States, residing at Cleveland, in the county of Cuyahoga and State of Ohio, have invented a certain new and useful Improvement in Waste-Valves, of which the following is a full, clear, and exact description, reference being had to the accompanying drawings.

This invention relates generally to valves and more particularly to one of the compression type provided with a waste passage.

In valves of this type as usually constructed the bonnet of the valve has been provided with a lateral extension which is bored and threaded and adapted to receive a screw plug by means of which the waste passage is closed or opened as desired. These bonnets having the waste passage, have been connected to the body of the valve by means of a gland nut, and whenever the bonnet has been provided with a lateral extension to accommodate the waste passage it is of course necessary to increase the size of the connecting gland nut in order to pass over the extension, and the bonnet itself has usually been materially increased in size.

These features of construction are objectionable for the reason that they are expensive as they require an additional amount of metal and a corresponding additional amount of labor in shaping and finishing the same.

The object of my invention, therefore, is to eliminate these objections and provide a bonnet of even smaller size than those generally employed, and connect this bonnet of reduced size to the body of the valve by means of a peculiarly constructed sleeve so that the said parts can be quickly and effectively united.

The invention consists in the novel features of construction hereinafter fully described and set forth in the appended claims.

In the drawings forming part of this specification, I have shown one embodiment of my inventive idea but it will be understood that other forms may be employed without departing from the broad principles of the invention as defined in the claims.

Figure 1:
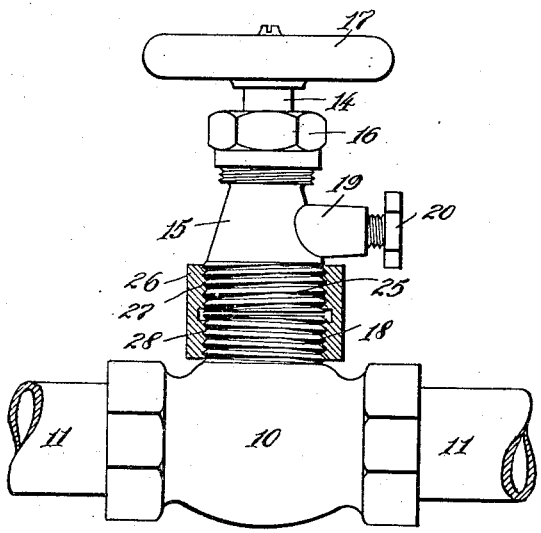
Figure 2:
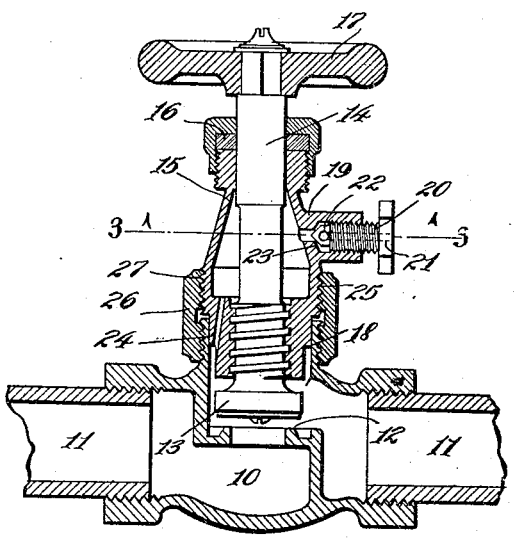
Figure 4:
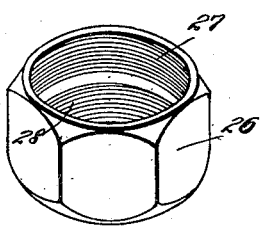

Figure 1 is a side elevation partly in section of my improved valve; Fig. 2 is a vertical sectional view; Fig. 3 is a section on the line 3—3 of Fig. 2; and Fig. 4 is a detail perspective view of the sleeve employed for connecting the bonnet and body of the valve.

The body of the valve 10 has the usual threaded ends for connection of the pipes 11, and the body of the valve is also provided with the usual form of valve seat 12 upon which the valve 13 is adapted to seat, this valve being of the usual or any approved construction, the stem 14 thereof extending through the bonnet 15, and gasket 16, and carrying the hand wheel 17 upon the outer end thereof. It will be noted, therefore, that the body of the valve is substantially the same as bodies heretofore employed except that the neck 18 is much smaller than necks heretofore employed and is also slightly longer. The bonnet 15 is preferably constructed with a lateral boss or projection 19 which is bored and threaded to receive the screw plug 20, this plug 20 having a passage 21 through which waste can escape when the plug is unseated, as shown in Fig. 3, the end of the plug having a tapered end 22 adapted to engage the tapered seat 23.

The inner or lower end of the bonnet is somewhat reduced, in diameter as shown at 24, in order to fit into the externally threaded neck 18 of the body of the valve, the interior of said neck being smooth to receive the end of bonnet. That portion of the bonnet directly above the reduced portion 24 is externally threaded as shown at 25, and it will be noted that the threads upon the bonnet are the reverse of the threads upon the neck 18, that is, one portion carries the right hand thread, while the other portion carries the left hand thread.

For the purpose of connecting the bonnet to the body I employ a sleeve 26 threaded internally at 27 and 28, the pitch of the threads 27 corresponding with the pitch of the threaded portion 25 while the pitch of the threads 28 corresponds with the pitch of the threaded portion 18. This construction and arrangement of parts enables me to dispense with the usual construction of gland nut for the purpose of uniting the bonnet and body of valve, as it is obvious that the sleeve 26 can be securely fastened to the bonnet and then the two connected to the body, thereby effectively and quickly uniting the bonnet and valve. If desired the sleeve can be connected to the body and then the bonnet connected to the sleeve, terial which way the connection is made. The bonnet although provided with a lateral extension having a waste passage is in striking contrast with those heretofore employed owing to the smallness of its size and the employment of the double threaded sleeve not only provides a perfectly safe and quick connection, but also does away with the use of the large threaded gland nut which would otherwise be necessary in order to pass over the lateral extension upon the bonnet.

Having thus described my invention, what I claim is:—

1. A valve of the kind described comprising a body portion having a neck and a bonnet portion having a reduced end adapted to extend into said neck, said bonnet having an integral lateral extension arranged above that portion of the bonnet extending into the neck, a threaded sleeve engaging a threaded portion of the bonnet below the integral lateral extension, the neck of the body portion being also externally threaded and engaged by said threaded sleeve.

2. A valve of the kind described comprising a body portion having an externally threaded neck, a bonnet portion having a reduced end extending into said neck, said bonnet having an integral lateral extension apertured and adapted to receive a needle valve, that portion of the bonnet below said extension being externally threaded, and a threaded sleeve adapted to engage the threaded portion of the bonnet and the threaded portion of the neck, the threads of said neck and bonnet portions being reverse.

3. A valve of the kind described comprising a body portion having an externally threaded neck, a bonnet portion having a reduced lower end adapted to enter said neck, said bonnet portion having an integral lateral extension, apertured and adapted to receive a needle valve, that portion of the bonnet below the lateral extension and above the neck being threaded and a sleeve screwed upon said threaded portion of the bonnet and also upon the exterior threaded neck thereby uniting the bonnet and body portions.

In testimony whereof, I hereunto affix my signature.

WILLIAM H. SMITH.

Copies of this patent may be obtained for five cents each, by addressing the "Commissioner of Patents, Washington, D. C."